No. 742,402. PATENTED OCT. 27, 1903.
A. DROST.
CHAIN LINK.
APPLICATION FILED DEC. 30, 1902.
NO MODEL.

Witnesses:
Edward Ray.
William Schulz

Inventor:
Adolf Drost
by his attorney
Hans von Briesen

No. 742,402. Patented October 27, 1903.

UNITED STATES PATENT OFFICE.

ADOLF DROST, OF ESSEN, GERMANY.

CHAIN-LINK.

SPECIFICATION forming part of Letters Patent No. 742,402, dated October 27, 1903.

Application filed December 30, 1902. Serial No. 137,087. (No model.)

*To all whom it may concern:*

Be it known that I, ADOLF DROST, a citizen of Germany, and a resident of Essen, Germany, have invented certain new and useful Improvements in Chain-Links, of which the following is a specification.

This invention relates to a chain-link the ends of which are joined without welding in such a manner that they will not open under ordinary strain and breaking at the joint is prevented. The chain-links may be readily constructed by machinery.

Figure 1:
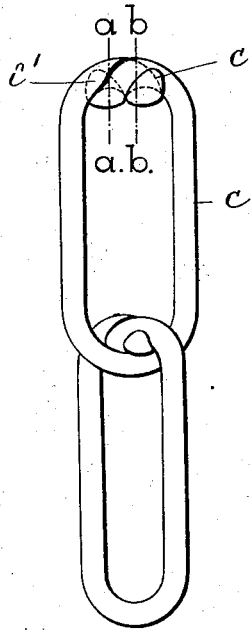
Figure 2:
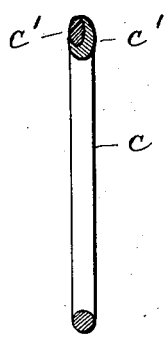
Figure 3:
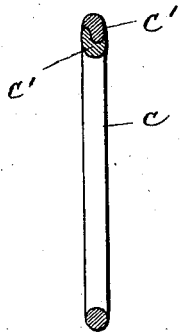
Figure 4:
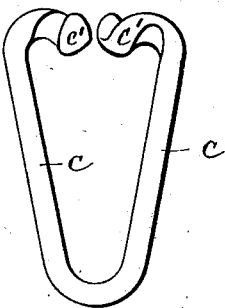

In the accompanying drawings, Figure 1 is a side view of a pair of closed chain-links embodying my invention. Fig. 2 is a section on line $a\ a$, Fig. 1; Fig. 3, a section on line $b\ b$, Fig. 1; and Fig. 4 a side view of the open chain-link.

The letter $c$ represents a chain-link composed of bar-iron and made of suitable form. Each of the two ends $c'$ is flattened and is bent first inward and then outward, thus forming a pair of spirals that extend in opposite directions, Fig. 4. The ends thus formed are first brought into engagement and are then compressed or flattened sidewise to become interlocked.

The chain-link constructed in the above manner is very strong and will not break or open under ordinary strain.

What I claim is—

A chain-link provided with a pair of flattened and laterally-compressed ends which extend spirally in opposite directions, substantially as specified.

Signed by me at Dusseldorf, Germany, this 15th day of December, 1902.

ADOLF DROST.

Witnesses:
 WILLIAM ESSENWEIN,
 PETER LIEBER.